UNITED STATES PATENT OFFICE.

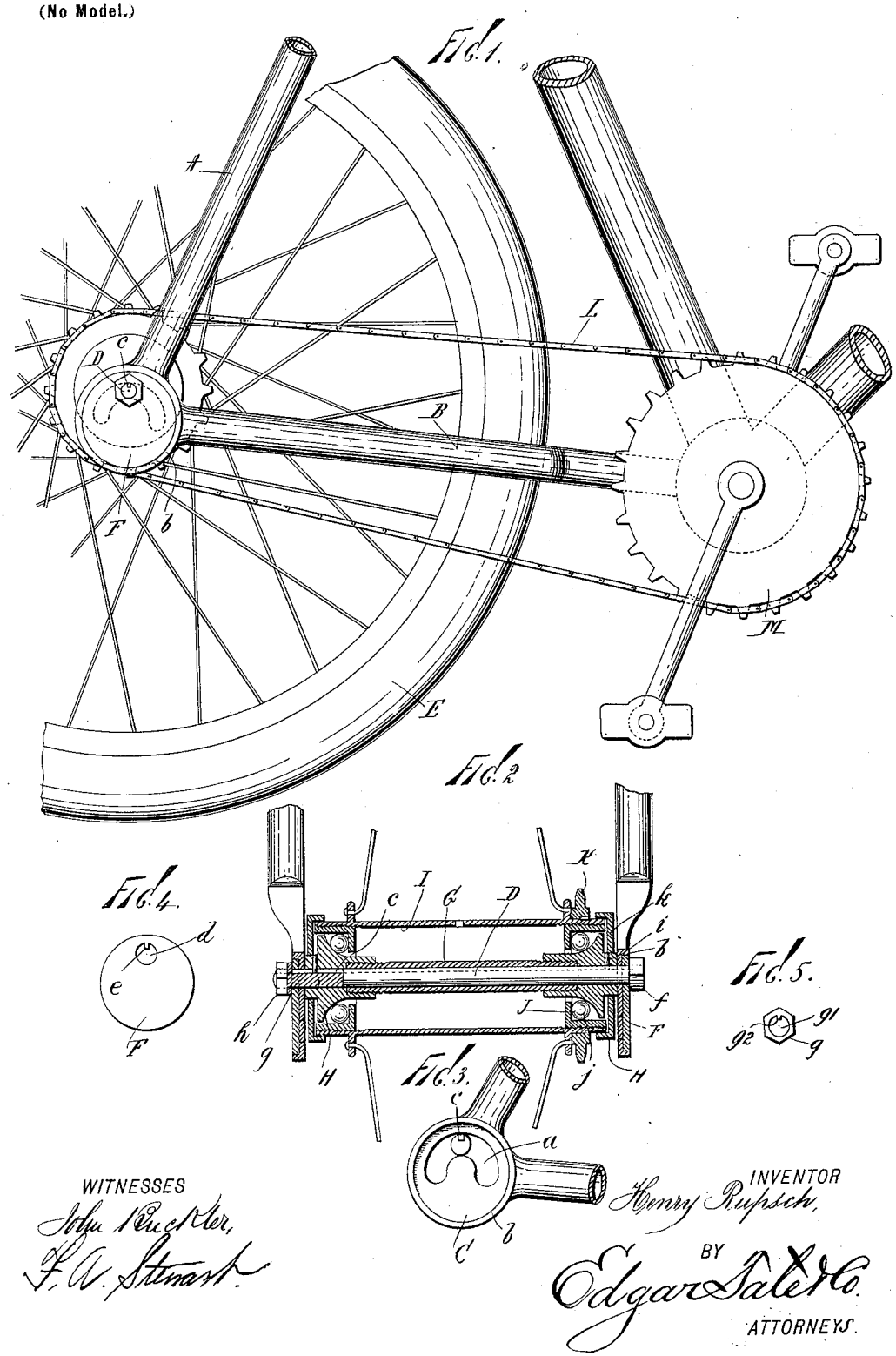

HENRY RUPSCH, OF NEW YORK, N. Y.

CHAIN-ADJUSTER AND HUB FOR BICYCLES.

SPECIFICATION forming part of Letters Patent No. 654,182, dated July 24, 1900.

Application filed November 13, 1899. Serial No. 736,724. (No model.)

*To all whom it may concern:*

Be it known that I, HENRY RUPSCH, a citizen of the United States, residing at New York, in the county of New York and State of New York, have invented certain new and useful Improvements in Chain-Adjusters and Hubs for Bicycles, of which the following is a full and complete specification, such as will enable those skilled in the art to which it appertains to make and use the same.

This invention relates to chain-adjusters and hubs for bicycles, and has for one object to provide an improved means whereby the position of the rear axle of a bicycle may be altered relatively to the frame, whereby to tighten the sprocket-chain or other connection between the operative gears of the wheel, a further object of the invention being to produce an improved construction of chain-adjuster and hub presenting many structural advantages.

My invention consists in the novel elements and arrangement of parts hereinafter fully described.

In the accompanying drawings, forming part of this specification, in which like letters of reference denote corresponding parts in the several views, Figure 1 is a side elevation of a portion of a bicycle embodying my invention. Fig. 2 is a central vertical section of the hub with the two rear stays thereon, but portions of the latter being shown and these partially in elevation and a portion of the axle being also in elevation. Fig. 3 is a side elevation of the rear angular portion of the bicycle-frame with the inclosing disk removed therefrom. Fig. 4 is an elevation of the disk removed. Fig. 5 is an elvation of a washer forming part of the device.

In the practice of my invention I connect the rear stay A and the rim B of the horizontal fork of the frame upon either side of the frame by forming therewith or securing thereto a disk C, provided with a semicircular slot $a$ of a width corresponding approximately to the diameter of the axle D of the rear wheel E. The outer face of the disk C is provided with an annular flange $b$ to form a recess, in which is inserted an inclosing disk or plate F. The axle D is provided with a longitudinal groove $c$ in its upper face and in practice is supported in the slots $a$ of the disks C and also in the inclosing disks F, which are provided, near the top thereof, with aperture $d$ to receive the axle therethrough and with downwardly-projecting lugs $e$ with said aperture to engage in the groove $c$ in said axle. The axle is provided at one end with an integral head $f$, the opposite end being screw-threaded and having mounted thereon a hexagonal washer $g$ (shown in Fig. 5) and a nut $h$ upon the outer screw-threaded end. The washer $g$ is provided with an aperture $g'$ and a downwardly-ranging projection $g^2$ within the same, which extends into the groove in the axle, whereby when a wrench is placed upon the washer or upon both the nut $h$ and the washer the axle may be turned or moved.

Upon the center of the axle is mounted a sleeve G, the opposite ends of which are externally screw-threaded to enter the inner ends of the cones H, which are mounted partially thereon and partially directly upon the axle, being secured to said axle in any desired manner, but preferably detachably by means of pins or keys $i$ entering the groove $c$, said cones being internally threaded to engage the threaded ends of the sleeve G. The hub I of the bicycle is internally threaded at its ends to receive therein the externally-threaded cups J, between which and the cones H are placed the usual steel balls $j$. The cones have mounted thereon flange-caps $k$, which surround the outer ends of the hub and render the bearings dust-proof, and the hub also has secured thereto the usual sprocket-wheel K or analogous gear connected by a sprocket-chain L with the pedal-sprocket M. In order to tighten the chain L upon the sprockets, the axle is in my invention, as is customary with similar adjusting devices, moved or altered in position relatively to the rods A and B of the frame, and therefore likewise is adjusted relatively to the pedal-sprocket M. In my newly-invented adjusting device this is accomplished by first unscrewing the nut $h$, thereby loosening the inclosing disks F and the axle D. The axle can then be moved either forwardly or rearwardly in the slots $a$ of the disks C, carrying with it in its longitudinal and partially-rotatory movement the inclosing disks F, which turn therewith in virtue of their connection with said axle through the projecting lugs $e$. The turning or movement of the axle is effected, preferably, by means of a wrench applied to the washer $g$ or to both said washer and the head $f$ on the opposite end of the axle. When the accurate adjustment of the chain is accomplished, the nut $h$ is then screwed up, thereby frictionally holding the axle in its adjusted position in the slots $a$, the inability of the disks F to turn after said nut $h$ is tightened being perfectly effective to hold said axle against movement in either direction.

It will be noticed that by the construction of hub which I have hereinabove described the cones H may be tightened or mutually adjusted, as may also the cups J. When it is desired to take the hub apart, this can be done very readily by disconnecting the various elements, as will be obvious.

The advantages of my invention will be manifest to all who are skilled in the art to which it appertains.

Having fully described my invention, I claim as new and desire to secure by Letters Patent—

In a chain-adjuster and hub for bicycles and similar vehicles, the combination with devices for connecting the rear stays and horizontal rods of the frame, and which are provided with curved slots therein, and outwardly-projecting annular flanges; of an axle mounted in said slots and provided with a longitudinal groove therein; frictional inclosing disks mounted within said annular flanges and apertured to receive the axle therethrough, and provided with projecting lugs to enter the slot in said axle, whereby the said lugs turn therewith; said axle being provided with a head at one end which frictionally engages one of the disks, and being screw-threaded at the opposite end, and provided with a polygonal washer having a projecting lug which enters the groove of the axle, and frictionally engages the adjacent disk; and a nut mounted upon said axle to hold the parts in frictional engagement.

In testimony that I claim the foregoing as my invention I have signed my name, in presence of the subscribing witnesses, this 4th day of November, 1899.

HENRY RUPSCH.

Witnesses:
 F. A. STEWART,
 K. E. LANGTRY.